United States Patent
Matthias et al.

(10) Patent No.: US 8,545,259 B2
(45) Date of Patent: Oct. 1, 2013

(54) SPARE MODULE FOR HANDHELD POWER TOOL

(75) Inventors: Wolf Matthias, Stuttgart (DE); Gunter Flinspach, Leonberg (DE); Alexander Osswald, Stuttgart (DE); Rainer Glauning, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 104 days.

(21) Appl. No.: 12/960,993

(22) Filed: Dec. 6, 2010

(65) Prior Publication Data

US 2011/0143561 A1 Jun. 16, 2011

(30) Foreign Application Priority Data

Dec. 15, 2009 (DE) .......................... 10 2009 054 639

(51) Int. Cl.
*H01R 3/00* (2006.01)
(52) U.S. Cl.
USPC .......................................... 439/500; 439/928
(58) Field of Classification Search
USPC ................................. 439/135–137, 500, 928
See application file for complete search history.

(56) References Cited

U.S. PATENT DOCUMENTS

| 4,277,135 | A | * | 7/1981 | Schrott et al. | 385/75 |
| 4,688,864 | A | * | 8/1987 | Sorel | 439/74 |
| 4,969,830 | A | * | 11/1990 | Daly et al. | 439/136 |
| 5,057,971 | A | * | 10/1991 | Hautvast et al. | 361/740 |
| 5,136,229 | A | * | 8/1992 | Galvin | 320/112 |
| 5,865,499 | A | * | 2/1999 | Keyser | 296/173 |
| 6,366,454 | B1 | * | 4/2002 | Rapaich et al. | 361/679.08 |
| 6,450,833 | B1 | * | 9/2002 | Brown et al. | 439/518 |
| 6,656,626 | B1 | * | 12/2003 | Mooty et al. | 429/99 |
| 6,692,310 | B2 | * | 2/2004 | Zaderej et al. | 439/701 |
| 6,802,725 | B2 | * | 10/2004 | Rowland et al. | 439/144 |
| 7,575,450 | B2 | * | 8/2009 | Williams et al. | 439/144 |
| 7,758,360 | B2 | * | 7/2010 | Lesage et al. | 439/147 |
| 2009/0237012 | A1 | * | 9/2009 | Yokoyama et al. | 318/139 |

FOREIGN PATENT DOCUMENTS

WO 2009057809 A1 5/2009

* cited by examiner

*Primary Examiner* — Neil Abrams
*Assistant Examiner* — Travis Chambers
(74) *Attorney, Agent, or Firm* — Kenyon & Kenyon LLP

(57) ABSTRACT

The invention is based on a spare handheld power tool module, having at least one interface that has at least one contact region and at least one electrical contact that is disposed at least partly in the contact region. It is proposed that the interface has at least one closure unit, which is provided for covering the contact region.

19 Claims, 2 Drawing Sheets

SPARE MODULE FOR HANDHELD POWER TOOL

CROSS-REFERENCE TO RELATED APPLICATION

This application is based on German Patent Application 10 2009 054 639.1 filed on Dec. 15, 2009.

BACKGROUND OF THE INVENTION

1. Field of the Invention

The invention is based on a spare handheld power tool module.

2. Description of the Prior Art

A spare handheld power tool module, having at least one interface that has at least one contact region and at least one electrical contact that is disposed at least partly in the contact region, has already been proposed.

SUMMARY OF THE INVENTION

The invention is based on a spare handheld power tool module, having at least one interface that has at least one contact region and at least one electrical contact that is disposed at least partly in the contact region.

It is proposed that the interface has at least one closure unit, which is provided for covering the contact region. The term "spare handheld power tool module" should be understood in particular to mean a rechargeable handheld power tool battery and/or advantageously a spare module embodied separately from a handheld power tool or from a rechargeable handheld power tool battery. Preferably, the spare handheld power tool module is provided for retrofitting the handheld power tool with a function and/or a property. For instance, by means of a suitably embodied spare handheld power tool module, the handheld power tool could be retrofitted with in particular a wireless and/or inductive charging option, an energy reservoir for operating energy, a fuel cell as an energy reservoir, an operation data memory, a monitoring and/or documentation device, anti-theft protection, an adjustable and/or standardized energy output, a communication device, and/or a measuring tool. The term "interface" should be understood in particular to mean a device which is provide for bringing about an energy-transmitting, mechanical and/or advantageously data-transmitting connection to a third device, or in other words in particular to a handheld power tool, a rechargeable handheld power tool battery, and/or advantageously to another spare handheld power tool module. The term "contact region" should be understood in particular to mean a region in which, in a contacted operating state, contacting takes place between the third device and the contact. The phrase "the region in which the contacting takes place" should be understood to mean an electrically conductive region of the spare handheld power tool module that adjoins an electrically conductive touch face, and a region that adjoins the electrically conductive touch face and that is provided for receiving an electrically conductive region of the third device. In this context, the term "electrically conductive touch face" should be understood to mean a face which produces an electrically conductive connection between the spare handheld power tool module and the third device. The term "adjoining region" should be understood in particular to mean a region which can be spaced apart from the electrically conductive touch face by up to 2 mm, advantageously up to 5 mm, and especially advantageously up to 10 mm. Alternatively or in addition, the term contact region can be understood to mean a region which is surrounded by the conductive touch face in a plane by at least 90 degrees, advantageously at least 180 degrees, and especially advantageously at least 270 degrees. The term "electrical contact" should be understood in particular to mean an element which is provided for producing an electrically conductive connection to the third device directly. The term "provided" should be understood in particular to mean especially equipped, designed, and/or programmed. The expression "cover a contact region" should be understood in particular to mean that the closure unit, in particular together with a housing, covers the contact region in a contacting direction to at most 1 mm$^2$ and advantageously completely. The term "contacting direction" should be understood in particular to mean a direction in which a user moves a contact element of the third device, in particular a securing element, of a different spare handheld power tool module for the purpose of contacting. The embodiment according to the invention of the spare handheld power tool module makes it possible to attain especially reliable, safe operation of the spare handheld power tool module and in particular to protect an uncontacted contact.

In a further feature, it is proposed that the closure unit seals off the contact region in a contacted operating state and/or advantageously in an uncontacted operating state, thus making it possible to prevent dust and/or moisture from penetrating into the contact region during operation, storage, particularly when the spare handheld power tool module is uncontacted; as a result, especially high reliability and great safety are possible. The term "contacted operating state" should be understood in particular to mean an operating state in which the contact is effectively connected to a contact element of a third device, the contact element advantageously being embodied as a securing element. Preferably, the closure unit touches the contact element of the third device. The term "uncontacted operating state" should be understood in particular to mean a state in which the contact, and advantageously the closure unit, are spaced apart from faces of a third device, such as the contact element of the third device, in particular. The term "seal off" should be understood in particular to mean that the closure unit prevents dust, moisture and/or dirt from advancing at least as far as the touch face of the contact. Preferably, the closure unit protects the contact in accordance with DIN EN standard 60529 (VDE 0470-1) with at least protection class IP2X, and advantageously at least IP5x, and especially advantageously at least IP54.

It is also proposed that in at least one operating state the closure unit automatically closes, and as a result great convenient and especially great safety and reliability can be attained. "Closes automatically" should be understood in particular to mean that the closure unit, at a transition from a contacted operating state to an uncontacted operating state, independently covers the contact region in which, especially beforehand, a contact element of a third device, and in particular the securing element, was disposed. The closure unit is moved in the process preferably by a spring force and/or by a force generated by an actuator.

It is also proposed that the contact region is disposed in countersunk fashion, making an especially safe spare handheld power tool module possible in a structurally simple way. The expression "disposed in countersunk fashion" should be understood in particular to mean that the contact region is spaced apart from at least one plane of an outer surface of the spare handheld power tool module, by which outer surface the interface is contactable, by at least 0.2 mm, advantageously at least 1 mm, and especially advantageously at least 5 mm in the contacting direction.

It is furthermore proposed that the closure unit is embodied as at least partly elastically deformable, making it possible to save costs, space, and engineering effort. The term "elastically deformable" should be understood in particular to mean that at least one element of the closure unit, especially in a contacting operation, changes its shape reversibly, and returns to its original shape with the withdrawal of a force that changes the shape. At least one point on the element of the closure unit is moved relative to another point of the element by at least 0.5 mm, advantageously at least 1 mm, and especially advantageously at least 2 mm. Advantageously, the closure unit is elastically deformable by a securing element of a third device, in particular of a further spare handheld power tool module, upon an operational contacting event.

It is furthermore proposed that the interface includes at least one thread, making an especially stable mechanical connection possible in a structurally simple way. Alternatively or in addition, the interface could have a bayonet mount and/or some other securing element that appears appropriate to one skilled in the art, such as in particular a detent connection, and so forth.

It is furthermore proposed the spare handheld power tool module has at least one securing element which is embodied in complementary fashion to the interface. The term "securing element" should be understood in particular to mean an element which is provided for connecting the spare handheld power tool module and the third device in a manner protected against unintentional disconnection. Preferably, at least 40%, and advantageously at least 75%, of the forces that connect the spare handheld power tool module and the third module, are transmitted jointly by at least one securing element and/or securing elements of a similar type, that is, those provided in particular for transmitting power and/or data. The phrase "embodied in complementary fashion" should be understood in particular to mean that the securing element is provided for contacting at least one contact of a further spare handheld power tool module. Because of the complementary securing element, engineering effort can be saved, and in particular, a plurality of spare handheld power tool modules can be connected especially flexibly.

In an advantageous feature of the invention, it is proposed that the securing element is provided for contacting an electrically conductive contact, so that in a structurally simple, safe and reliable way, a plurality of spare handheld power tool modules can be connected to one another, and additional components can be dispensed with. Advantageously, in an installed operating state, the securing element contacts an electrically conductive contact of a third device. The term "contacting" should be understood in particular to mean that the securing element in at least one operating state makes a conductive connection for transmitting power and/or data.

In a further feature, it is proposed that the interface and the securing element are provided for outputting an electrical power, in particular to a third device, as a result of which an especially flexible system is possible, comprising a plurality of devices and in particular a plurality of spare handheld power tool modules, in particular a rechargeable handheld power tool battery and a handheld power tool. Advantageously, the interface and in particular the securing element has a protection circuit and/or triggering device, which are provided for outputting an electrical power. Furthermore, at least the interface and in particular the securing element as well are provided for receiving an electrical power.

It is furthermore provided that the securing element includes at least one thread, making an especially reliable, inexpensive connection possible in a structurally simple way. Alternatively or in addition, the securing element could have a bayonet mount and/or some other securing element, appearing appropriate to one skilled in the art, in particular such as a detent connection, and so forth.

Moreover, the invention is based on a rechargeable handheld power tool battery, having an interface that can be contacted by a spare handheld power tool module of the invention. In particular, the term "rechargeable handheld power tool battery" should be understood to mean a device with an energy reservoir that is provided for furnishing operating energy for a primary energy consumer, in particular a drive motor and/or a measurement sensor, of the handheld power tool. Advantageously, the interface is provided for outputting an electrical power to a spare handheld power tool module of the invention. It is furthermore proposed that the interface has at least one closure unit which is provided for covering a contact region of the interface. Advantageously, the closure unit of the rechargeable handheld power tool battery has at least one characteristic and preferably all the characteristics of the closure unit of the spare handheld power tool module. Advantageously, the rechargeable handheld power tool battery has a handheld power tool interface, which is provided for supplying a handheld power tool with an operating energy, and which is advantageously embodied separately from the interface for the spare handheld power tool module; that is, in particular they are disposed on different sides. By the embodiment according to the invention of the rechargeable handheld power tool battery, the spare handheld power tool module can be connected to the handheld power tool especially flexibly, and in particular an arbitrary handheld power tool with a replacement battery can be retrofitted with a rechargeable handheld power tool battery of the invention and at least one spare handheld power tool module of the invention.

The invention is furthermore based on a system having a handheld power tool, a rechargeable handheld power tool battery of the invention, and a spare handheld power tool module of the invention; all handheld power tools that appear appropriate to one skilled in the art, such as in particular power drills, rotary hammers, saws, planes, screwdrivers, milling cutters, sanders, right-angle sanders, manual measuring instruments, and/or multifunction tools would be conceivable.

BRIEF DESCRIPTION OF THE DRAWINGS

The invention will be described in the ensuing detailed description of a preferred embodiment taken in conjunction with the drawings, in which.

DESCRIPTION OF THE PREFERRED EMBODIMENT

Figure 1:
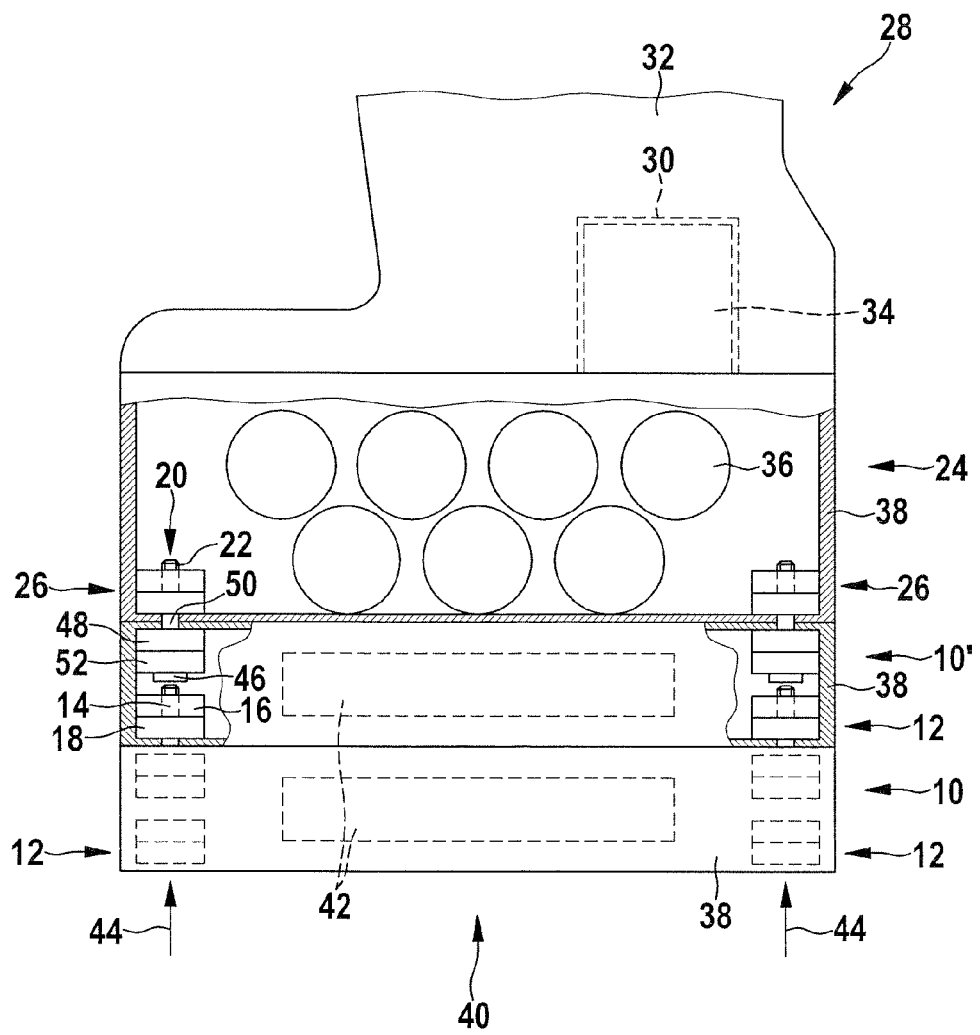
FIG. 1 shows a system having a handheld power tool, a rechargeable handheld power tool battery, and two spare handheld power tool modules of the invention that have contact regions and closure units.

FIG. 1 shows a system having two spare handheld power tool modules 10, 10', a rechargeable handheld power tool battery 24, and a handheld power tool 28. The rechargeable handheld power tool battery 24 could be embodied as a spare handheld power tool module. The handheld power tool 28 is embodied as a cordless power drill and has a battery interface 30, which is disposed on a main handle 32 of the handheld power tool 28. The battery interface 30 of the handheld power tool 28 is connected, in an operationally ready state, to a handheld power tool interface 34 of the rechargeable handheld power tool battery 24. Via the handheld power tool interface 34, the rechargeable handheld power tool battery 24 supplies the handheld power tool 28 with operating energy from an energy reservoir 36. Alternatively, a battery interface or some other interface of a handheld power tool could be connected to a spare handheld power tool module.

The spare handheld power tool modules 10, 10' and the rechargeable handheld power tool battery 24 each have a housing 38 and four interfaces 12, 26 each. Each of the interfaces 12, 26 includes one contact region 14 and one electrical contact 16. During operation, two of the interfaces 12, 26 jointly output an electrical power to a primary energy consumer, or receive an electrical power for a primary energy consumer. Two of the interfaces 12, 26 jointly transmit a power, which forwards information. The electrical contacts 16 are each disposed partly in the contact region 14. In the case of the rechargeable handheld power tool battery 24, the interfaces 26 are disposed on a side of the rechargeable handheld power tool battery 24 facing away from the handheld power tool interface 34. The interfaces 12 of the spare handheld power tool modules 10, 10' are disposed, in an installed operating state, on a side of the respective spare handheld power tool module 10, 10' facing away from the rechargeable handheld power tool battery 24. The interfaces 12, 26 of the spare handheld power tool modules 10, 10' and of the rechargeable handheld power tool battery 24 are each contactable by different spare handheld power tool modules 10, 10'.

The interfaces 12, 26 each have one closure unit 18. The closure units 18 cover and seal off the respective contacts electrical 16 and the contact regions 14 completely, in both a contacted operating state and an uncontacted operating state. Also, once the interfaces 12, 26 have been uncontacted, the closure units 18 close automatically and cover and seal off the contact regions 14 completely. To that end, the closure units 18 are each disposed between the respective electrical contact 16 and a respective side 40 of the housing 38, through which the various interfaces 12, 26 are contactable. The closure units 18 each have one seal, not shown in detail in FIG. 2.

Figure 2:
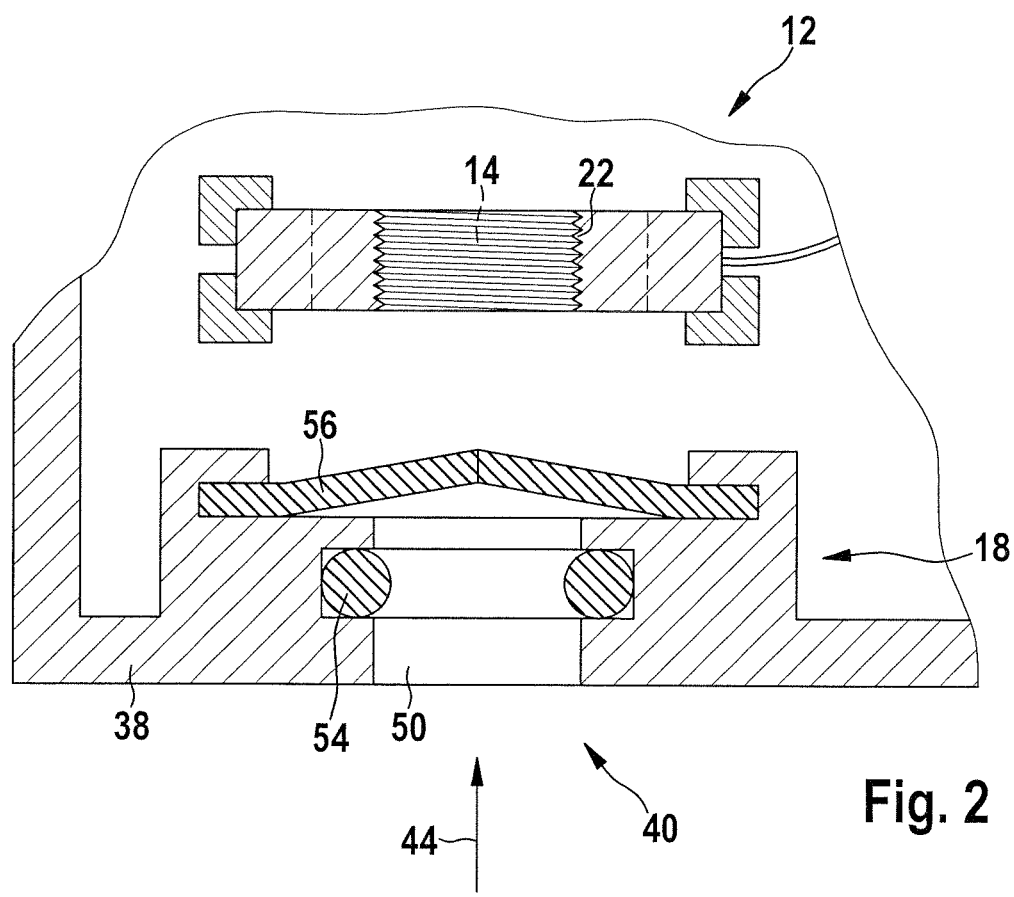
FIG. 2 shows the contact region and the closure unit of FIG. 1.

The electrical contacts 16 of the spare handheld power tool modules 10, 10' and of the rechargeable handheld power tool battery 24 are embodied as electrically conductive nuts, with a female thread 22, and are contacted electrically conductively by operating means 42 of the spare handheld power tool modules 10, 10' and of the rechargeable handheld power tool battery 24. The electrical contacts 16 are disposed in the housing 38 in a manner fixed against relative rotation (FIG. 2). The operating means 42 of the spare handheld power tool modules 10, 10' are embodied as primary energy consumers. The contact regions 14 are each embodied as axial regions, disposed inside the electrical contacts 16, in a contacting direction 44 of the interfaces 12, 26. Thus the contact regions 14 are disposed in countersunk fashion.

The spare handheld power tool modules 10, 10' furthermore have four securing elements 20. The securing elements 20 are each embodied as screws, with a screw head 46 and a male thread 22. Moreover, the securing elements 20 are each sealed off by seals 48, which have an O-ring. The securing elements 20 can be reached with a screwdriver through interface openings 50 of the interfaces 12, through which the interfaces 12 can be contacted. The securing elements 20 are furthermore connected electrically conductively, each via a respective contact unit 52 of the securing elements 20, to the operating means 42 of the spare handheld power tool module 10, 10'. The contact units 52 are disposed in the housing 38 in a manner fixed against relative rotation.

In a state ready for operation, the securing elements 20 of one spare handheld power tool module 10 are screwed into contacts 16 of another spare handheld power tool module 10'. Thus the securing elements 20 are embodied in complementary fashion to the interfaces 12, 26. Moreover, the securing elements 20 of one spare handheld power tool module 10 thus, in a state ready for operation, contact the electrically conductive contacts 16 of a third spare handheld power tool module 10'. During operation, two securing elements 20 jointly output an electrical power to a primary energy consumer, or absorb an electrical power for a primary energy consumer. Two of the securing elements 20 jointly transmit a power, which forwards information.

FIG. 2 shows as an example one of the contact regions 14, one of the electrical contacts 16, one of the closure units 18, and part of one of the housings 38 of one of the spare handheld power tool modules 10, 10' of FIG. 1. The closure units 18 have two sealing elements 54, 56 that are embodied elastically deformably. One of the sealing elements, 54, provides sealing in a contacted operating state, and is embodied as an O-ring. The other of the sealing elements, 56, provides sealing in an uncontacted operating state, and is embodied as two opposed sealing lips, which touch one another in an uncontacted operating state and thus provide sealing. Alternatively, the sealing elements 54, 56 could be embodied as an O-ring, a sealing lip, a labyrinth seal, and/or some other seal that appears appropriate to one skilled in the art, and/or in particular as a rubber diaphragm with a crosswise-slit opening. Also, alternatively, a single sealing element appearing appropriate to one skilled in the art per interface could seal off the respective electrical contact 16 and the respective contact region 14 in both a contacted operating state and an uncontacted operating state.

The foregoing relates to a preferred exemplary embodiment of the invention, it being understood that other variants and embodiments thereof are possible within the spirit and scope of the invention, the latter being defined by the appended claims.

The invention claimed is:

1. At least one spare handheld power tool module, comprising:
a power tool module arrangement adapted to be electrically connected to one of a primary handheld power tool battery and at least one spare handheld power tool module, the battery having a primary interface adapted to be electrically connected to a handheld power tool, the module and battery each having at least one interface that has at least one contact region and at least one electrical contact that is disposed at least partly in the contact region, the interface having at least one closure unit which covers the contact region;
wherein the at least one module is adapted to be electrically connected to the at least one interface of the battery or to the at least one interface of the spare handheld power tool module in a stackable arrangement, and
wherein the closure unit has at least one sealing element that is at least partly elastically deformable.

2. The at least one spare handheld power tool module as defined by claim 1, wherein the contact region is disposed in a countersunk configuration.

3. The at least one spare handheld power tool module as defined by claim 1, wherein the closure unit has two sealing elements.

4. The at least one spare handheld power tool module as defined by claim 1, wherein one of the at least one sealing elements provides sealing in a contacted operating state, and wherein the other one of the at least one sealing elements provides sealing in an uncontacted operating state.

5. The at least one spare handheld power tool module as defined by claim 1, wherein one of the at least one sealing elements is embodied as an O-ring, and wherein the other one of the at least one sealing elements is embodied as two opposed sealing lips.

6. The at least one spare handheld power tool module as defined by claim 1, wherein the closure unit, in a at least one of a contacted operating state and an uncontacted operating state, seals off the contact region.

7. The at least one spare handheld power tool module as defined by claim 6, wherein the contact region is disposed in a countersunk configuration.

8. The at least one spare handheld power tool module as defined by claim 6, wherein the closure unit, in at least one operating state, closes automatically.

9. The at least one spare handheld power tool module as defined by claim 8, wherein the contact region is disposed in a countersunk configuration.

10. The at least one spare handheld power tool module as defined by claim 1, wherein the closure unit, in at least one operating state, closes automatically.

11. The at least one spare handheld power tool module as defined by claim 10, wherein the contact region is disposed in a countersunk configuration.

12. The at least one spare handheld power tool module as defined by claim 1, having at least one securing element, which is embodied in complementary fashion to the interface.

13. The at least one spare handheld power tool module as defined by claim 12, wherein the securing element is provided for contacting an electrically conductive contact.

14. The at least one spare handheld power tool module as defined by claim 12, wherein the interface and the securing element are provided for outputting an electrical power.

15. A spare handheld power tool module, comprising:
a power tool module arrangement adapted to be electrically connected to one of a primary handheld power tool battery and at least another spare handheld power tool module, the battery having a primary interface adapted to be electrically connected to a handheld power tool, the module and battery each having at least one interface that has at least one contact region and at least one electrical contact that is disposed at least partly in the contact region, the interface having at least one closure unit which covers the contact region;
wherein the at least one module is adapted to be electrically connected to the at least one interface of the battery or to the at least one interface of the another spare handheld power tool module in a stackable arrangement, and
wherein the interface includes at least one thread.

16. A spare handheld power tool module, comprising:
a power tool module arrangement adapted to be electrically connected to one of a primary handheld power tool battery and at least another spare handheld power tool module, the battery having a primary interface adapted to be electrically connected to a handheld power tool, the module and battery each having at least one interface that has at least one contact region and at least one electrical contact that is disposed at least partly in the contact region, the interface having at least one closure unit which covers the contact region;
wherein the at least one module is adapted to be electrically connected to the at least one interface of the battery or to the at least one interface of the another spare handheld power tool module in a stackable arrangement,
wherein the contact region is disposed in countersunk fashion, and
wherein the interface includes at least one thread.

17. The at least one spare handheld power tool module as defined by claim 16, having at least one securing element, which is embodied in complementary fashion to the interface.

18. A rechargeable handheld power tool battery, comprising:
at least one interface that has at least one contact region and at least one electrical contact that is disposed at least partly in the contact region, the interface having at least one closure unit which covers the contact region, wherein the battery is adapted to be electrically connected at the at least one interface of the battery to a spare handheld power tool module in a stackable arrangement;
wherein the spare handheld power tool module includes a power tool module arrangement adapted to be electrically connected to one of a primary handheld power tool battery and at least another spare handheld power tool module, the battery having a primary interface adapted to be electrically connected to a handheld power tool, the module and battery each having at least one interface that has at least one contact region and at least one electrical contact that is disposed at least partly in the contact region, the interface having at least one closure unit which covers the contact region, and
wherein the at least one module is adapted to be electrically connected to the at least one interface of the battery or to the at least one interface of the another spare handheld power tool module in a stackable arrangement.

19. A rechargeable handheld power tool battery, comprising:
at least one interface that has at least one contact region and at least one electrical contact that is disposed at least partly in the contact region, the interface having at least one closure unit which covers the contact region, the battery is adapted to be electrically connected at the at least one interface of the battery to a spare handheld power tool module in a stackable arrangement;
wherein the spare handheld power tool module includes a power tool module arrangement adapted to be electrically connected to one of a primary handheld power tool battery and at least another spare handheld power tool module, the battery having a primary interface adapted to be electrically connected to a handheld power tool, the module and battery each having at least one interface that has at least one contact region and at least one electrical contact that is disposed at least partly in the contact region, the interface having at least one closure unit which covers the contact region, wherein the at least one module is adapted to be electrically connected to the at least one interface of the battery or to the at least one interface of the another spare handheld power tool module in a stackable arrangement, and
wherein the contact region is disposed in countersunk fashion.

* * * * *